May 6, 1924.
J. C. FORSBERG
ENLARGING PROJECTION PRINTER FOR PHOTOGRAPHS
Filed April 6, 1921
1,492,784
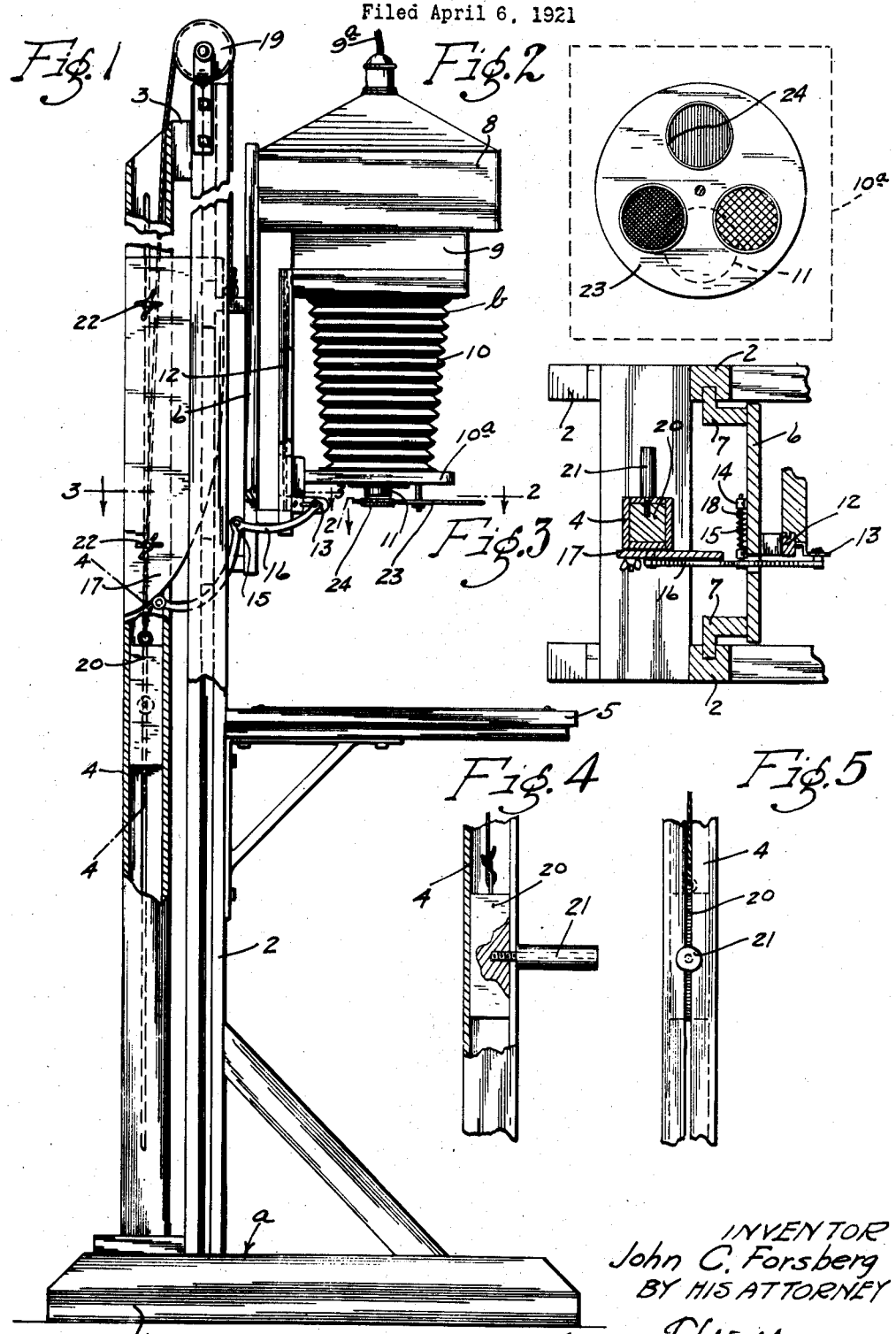
INVENTOR
John C. Forsberg
BY HIS ATTORNEY
James F. Williamson Patented May 6, 1924.

1,492,784

UNITED STATES PATENT OFFICE.

JOHN C. FORSBERG, OF MINNEAPOLIS, MINNESOTA.

ENLARGING PROJECTION PRINTER FOR PHOTOGRAPHS.

Application filed April 6, 1921. Serial No. 458,911.

*To all whom it may concern:*

Be it known that I, JOHN C. FORSBERG, a citizen of the United States, residing at Minneapolis, in the county of Hennepin and State of Minnesota, have invented certain new and useful Improvements in Enlarging Projection Printers for Photographs; and I do hereby declare the following to be a full, clear, and exact description of the invention, such as will enable others skilled in the art to which it appertains to make and use the same.

This invention relates to an enlarging projection printer for photographs. In projection work and in making enlarged photographs by projecting apparatus it is well known to those skilled in the art that the projecting camera must be properly focussed so that the image appears sharply defined on the projecting surface. The size of the image varies with the distance of the projector from the projecting surface and the camera must be adjusted for a different focus for each position.

It is an object of this invention to provide a projecting apparatus in which the camera is movable toward and from the plate or surface on which the image is projected, which apparatus embodies automatic means for adjusting the camera to the proper focus as the same is moved toward and from the projection surface so that the image is always sharply focussed on said surface no matter in what position the camera may be.

It is a further object of the invention to provide such projecting apparatus with a multiple screen whereby the projecting image can be suitably modified.

These and other objects and advantages of the invention will be apparent from the following description made in connection with the accompanying drawings in which like reference characters refer to the same parts throughout the different views; and in which Fig. 1 is a view in side elevation of the device, certain portions thereof being shown in section;

Fig. 2 is a section taken on the line 2—2 of Fig. 1 looking in the direction of the arrows;

Fig. 3 is a transverse section taken on the line 3—3 of Fig. 1 looking in the direction of the arrows;

Fig. 4 is a section taken on the line 4—4 of Fig. 1; and

Fig. 5 is a partial side elevation of the device.

Referring to the drawings, the apparatus comprises a frame member $a$ consisting of a suitable base member 1 to which suitably braced uprights 2 are secured which are connected at their top portion by cross piece 3. A hollow post structure 4 extends upwardly from the base in the rear of the member 2 and is secured at its upper end to the cross piece 3. A table or plate member 5 projects forwardly from the frame member above the lower portion thereof at a convenient height and is secured thereto by spaced angular brackets to which it is bolted and which are, in turn, bolted to the frame member 2. A projector or projecting camera $b$ is provided and suitably attached to a panel 6 which is provided with guide members 7 having tongue portions adapted to slide in guiding grooves formed in the innerside portions of the members 2.

The projector $b$ may be of any standard type and comprises a light and reflector chamber 8 provided with a suitable fixture for the entrance of light cords $9^a$ and below the chamber is disposed, a casing 9 adapted to contain a ground glass and to have suitable provision for the insertion of the plate carrying the image to be projected. The chamber 9 is attached to the usual bellows 10 provided at its lower or front portion with the lens panel $10^a$ equipped with a suitable lens 11. The camera carries a plate or panel 12 provided with guideways in which the base of member $10^a$ is adapted to slide and the panel member $10^a$ has secured thereto at its lower or front portion a slotted bracket 13.

The panel 6 on its rear side carries spaced brackets 14 in which is journaled a small shaft 15 which projects to one side of the brackets and has secured thereto a two-arm lever 16. The front arm of this lever is provided with a pin or roller passing through the horizontal slot in the bracket 13 and this arm projects through a slot formed in the lower portion of the panel 6. The rear arm of the lever 16 projects between the members 7 and is provided on its end with a roller member which is adapted to engage the edge face of a cycloidal cam member 17. A spring 18 coiled about the shaft 15 tends to swing the lever 16 so that its rear arm holds the said roller constantly in contact with the cam 17. The cam 17 is rigidly secured to one side of the post member 4.

The panel 6 is provided with a rearwardly projecting lug above its central portion and a cable attached to this lug passes over a sheave member 19 secured at the top of the frame member a and this cable has secured to its other end a weight member 20 adapted to slide in the hollow post 4. This weight member 20 forms a counterweight for the projector b. The post 4, at one side, is formed with a longitudinally extending slot through which the threaded portion of a handle member 21 projects, said portion being threaded into the weight 20. The handle 21 is used to raise and lower the weight and thus correspondingly move the projector b, the handle being turned slightly to bring its inner end out of contact with the post 4 and being again turned to bring said end into contact with the post 4 to clamp the same in its adjusted position.

The cam member 17 is provided with horizontal slots 22 through which threaded screws project from the post 4, these screws being provided with wing nuts. The cam 17 can thus be moved slightly forward or rearwardly.

The lens plate 10ª has a downwardly projecting pin, on which is secured for rotating movement by a suitable nut, a plate 23 provided with apertures equally spaced therein and cylindrical frame members 24 are disposed in said apertures and are equipped with screens of different character, either of fine wire or fabric, or lined transparent material.

The operation of the device is as follows.

The projector b being provided with the image plate and the light turned on, the image will be projected onto a suitable plate disposed on the table 5. The size of the image will depend upon the distance of the projector b from the table 5 and the said projector will be moved until the desired size of projection is obtained. As the projector is moved, the roller on the rear end of lever 16 moves on the cam, swinging said lever about its pivot 15 and the lens plate 10ª is moved toward or from the chamber 9 of the camera. The cam is so proportioned that the lens, automatically, will be moved to keep the image on the table 5 in proper focus whatever the position of the projector may be. A slide adjustment is provided for the cam 17 in order that it may initially be properly located with respect to the projector used on the machine. The various members 24 are moved under the lens to give different effects on the projected image corresponding to the distance of the projector from the plate. The projector is quite easily moved, owing to the same being nicely counterbalanced by the weight 20, and, as previously stated, the same can be held in any position by turning the handle 21 to clamp the side of the post.

While in the particular embodiment of the device illustrated the apparatus is shown with the camera movable vertically, it will be understood that the same can be made so that the camera moves in a horizontal plane.

From the above description it is seen that applicant has provided a very useful device and one in which much time will be saved in focussing the image. The enlargement of various sizes can be readily made by merely varying the position of the projector and no time will be taken for bringing the image to a proper focus as the image is always in focus, no matter what the size of the same may be.

It will, of course, be understood that various changes may be made in the form, details and arrangement of the device without departing from the scope of applicant's invention, which, generally stated, consists in the matter shown and described and set forth in the appended claims.

What is claimed is:

1. A device of the class described having in combination a frame, an image receiving plate mounted thereon, a projector comprising a lens movable on said frame toward and from said plate, a cam member on said frame, a lever pivoted on the projector and movable therewith having a roller at one end in contact with the cam and having its other end connected to said lens whereby said lens is moved to adjust the same, so that the image is properly focussed on said plate in any position of the projector.

2. A device of the class described having in combination, a vertical frame, an image receiving plate mounted thereon, a projecting camera mounted to slide in guides in said frame toward and from said plate and comprising a depending bellows carrying a movable lens frame, said lens frame being movable in guides carried by said camera, a cam carried at one side of said frame, an integral two-armed lever pivotally secured to the lower end of said camera below the lens frame having one arm movably connected with the said lens plate and having a roller at the end of its other arm disposed in contact with said cam plate whereby when the camera is movable toward and from said image plate the lens plate and bellows will be moved to maintain the focus.

3. A projecting apparatus having in combination, a frame comprising vertical guides, a projecting camera mounted to slide in said guides, a cable connected to said camera, a pulley adjacent the top of the frame over which said cable runs, a counterbalancing member connected to said cable, a vertical guide for said member having a vertical slot extending therethrough, a handle for raising and lowering the camera having a threaded portion extending through said slot and threaded into the counterbalancing member, said handle being adapted to be clamped against the guide for the counterbalancing member by rotative movement whereby said camera can be released, moved and clamped in fixed position by said handle.

In testimony whereof I affix my signature.

JOHN C. FORSBERG.